(12) United States Patent
Mani (10) Patent No.: US 9,005,350 B2
(45) Date of Patent: Apr. 14, 2015

(54) TRAP CANISTERS

(71) Applicant: Aisan Kogyo Kabushiki Kaisha, Obu-shi, Aichi-ken (JP)

(72) Inventor: Takashi Mani, Hekinan (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 0 days.

(21) Appl. No.: 13/846,309

(22) Filed: Mar. 18, 2013

(65) Prior Publication Data

US 2013/0263740 A1  Oct. 10, 2013

(30) Foreign Application Priority Data

Apr. 6, 2012 (JP) ................. 2012-087069

(51) Int. Cl.
*B01D 53/02* (2006.01)
*B01D 53/04* (2006.01)
*F02M 25/08* (2006.01)

(52) U.S. Cl.
CPC ....... *B01D 53/0407* (2013.01); *F02M 25/0854* (2013.01); *B01D 2259/4516* (2013.01)

(58) Field of Classification Search
CPC .................. B01D 2259/4516; B01D 53/0407; F02M 25/0854
See application file for complete search history.

(56) References Cited

U.S. PATENT DOCUMENTS

| 6,488,748 | B2 | 12/2002 | Yamafuji et al. | |
|---|---|---|---|---|
| 7,323,041 | B2* | 1/2008 | Yoshida et al. | 96/132 |
| 2005/0014642 | A1 | 1/2005 | Oi et al. | |
| 2009/0013973 | A1* | 1/2009 | Yamasaki | 123/519 |
| 2010/0147152 | A1* | 6/2010 | Kosugi | 96/146 |
| 2011/0214572 | A1 | 9/2011 | Hasegawa et al. | |
| 2013/0186375 | A1* | 7/2013 | Hasegawa et al. | 123/519 |

FOREIGN PATENT DOCUMENTS

| JP | 2001182631 A | 7/2001 |
|---|---|---|
| JP | 2002256989 A | 9/2002 |
| JP | 2005035812 A | 2/2005 |
| JP | 2011202652 A | 10/2011 |

* cited by examiner

*Primary Examiner* — Christopher P Jones
(74) *Attorney, Agent, or Firm* — Conley Rose, P.C.

(57) ABSTRACT

A trap canister for adsorbing fuel vapor contained in break-through gas discharged from a main canister. The trap canister may include a trap case having an adsorption chamber defined therein and containing an adsorption material, so that the break-through gas flows through the adsorption material in a gas flow direction. The adsorption chamber may include a gas introduction side and a gas outlet side located on a downstream side of the gas introduction side along the gas flow direction. The adsorption chamber may have a passage with a cross-sectional area gradually decreasing from the gas introduction side toward the gas outlet side. The trap canister may further include a temperature control device configured to control the temperature of the adsorption material.

14 Claims, 5 Drawing Sheets

TRAP CANISTERS

This application claims priority to Japanese patent application Ser. No. 2012-87069, the contents of which are incorporated herein by reference.

BACKGROUND OF THE INVENTION

Field of the Invention

Embodiments of the present invention relate to trap canisters that may be mounted mainly to vehicles, such as automobiles, for adsorbing fuel vapor contained in break-though gas. This break-through gas is discharged from canisters that can adsorb fuel vapor and then flows to the trap canisters.

Known trap canisters include a trap case having one end opened to the atmosphere and the other end from which break-through gas may be introduced. An adsorption chamber is defined in the trap case. Activated carbon used as a granular adsorption material capable of adsorbing and allowing desorption of fuel vapor may be placed within the adsorption chamber. The absorption chamber may have a uniform passage cross-sectional area throughout the length of the passage extending in a flow direction of the break-through gas. Japanese Laid-Open Publication No. 2005-35812 discloses a known trap canister configured in this way.

In the case of the known trap canister, the adsorption material of the trap canister may adsorb fuel vapor contained in the break-through gas discharged from the main canister that adsorbs fuel vapor. The fuel vapor adsorbed by the adsorption material may be desorbed (purged) by the negative pressure of intake air supplied to an engine. However, if a part of the fuel vapor still remains in the absorption material even after desorption by the negative pressure, the adsorbed fuel component (HC) may be desorbed from the adsorption material and discharged to the outside of the automobile, i.e., to the atmosphere, to cause a phenomenon called "a blow-through phenomenon". This typically occurs when the automobile is not driven. In general, activated carbon used as the absorption material has a broad distribution range with respect to pore-diameters. Pores having smaller diameters may have higher fuel vapor adsorption abilities and lower fuel vapor desorption abilities than pores having larger diameters. Therefore, as the ratio of pores having smaller diameters increases, the residual amount of fuel vapor that has not been desorbed from the activated carbon (more specifically, the residual amount of fuel vapor after the purge operation) increases, leading so an increase in the amount of blow-though fuel vapor that may be discharged to the atmosphere during parking of the automobile. In order to reduce the blow-though amount of fuel vapor, it has been proposed to increase a ratio (called as "L/D ratio") of the length L of the passage within the adsorption chamber to a diameter D of a circular area corresponding to the passage cross-sectional area. However, although the adsorption/desorption ability may increase as the L/D ratio increases, the resistance against the flow of gas, i.e., the loss of pressure, may increase. Therefore, for the trap canister, it has been difficult to satisfy both a reduction in the blow-through amount and a reduction in the loss of pressure. The reduction in the blow-through amount is particularly needed for improving DBL emission performance relating to fuel vapor (gasoline vapor (HC)) discharged from the automobile during parking.

Therefore, there has been a need in the art for a trap canister that can satisfy both of reduction in a blow-through amount of fuel vapor and reduction of loss of pressure of fuel vapor containing gas.

SUMMARY OF THE INVENTION

Its one aspect according to the present teachings, a trap canister can absorb fuel vapor contained in break-through gas discharged from a main canister. The trap canister may include a trap case having an adsorption chamber defined therein and containing an adsorption material, so that the break-through gas flows through the adsorption material in a gas flow direction. The adsorption chamber may include a gas introduction side and a gas outlet side located on a downstream side of the gas introduction side along the gas flow direction. The adsorption chamber may have a passage cross-sectional area gradually decreasing from the gas introduction side toward the gas outlet side. The trap canister may further include a temperature control device configured to control a temperature of the absorption material.

DETAILED DESCRIPTION OF THE INVENTION

Each of the additional features and teachings disclosed above and below may be utilized separately or in conjunction with other features and teachings to provide improved trap canisters. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one embodiment, a trap canister may adsorb fuel vapor contained in break-through gas discharged from a main canister. The main canister preferably has granular adsorption material contained in an adsorption chamber. This adsorption chamber is on a gas outlet side of the main canister. The trap canister may include a trap case having a first end open to the atmosphere and a second end for introducing the break-through gas. An adsorption chamber may be defined in the trap case and may have a granular adsorption material contained therein. The absorption material can absorb fuel vapor and allow desorption of fuel vapor. The adsorption chamber may include an atmospheric side having a first passage cross-sectional area and a gas introduction side having a second passage cross-sectional area larger than the first passage cross-sectional side. The cross-sectional area of the passage in the adsorption chamber may gradually change from the first passage cross-sectional area to the second passage cross-sectional area. The trap canister may further include a temperature control device configured to control a temperature of the adsorption material compared to the granular adsorption material contained in the absorption chamber on the gas outlet side of the main canister, the adsorption material contained in the adsorption chamber may have a higher adsorption ability with a larger butane working capacity. These comparisons are made in accordance with ASTM protocols.

With this arrangement of the trap canister, the following advantages can be achieved:

(i) Due to the fact that the cross-sectional area of the atmospheric side of the adsorption chamber is set to be smaller than that of the gas introduction side, the adsorption/desorption ability of the adsorption material can be improved. Increased pressure loss that may result due to smaller cross-sectional area may be inhibited or minimized by the increase of the passage cross-sectional area of the gas introduction side. In this way, it is possible to reduce the residual amount of the fuel vapor in the blow-through amount, while inhibiting an increase its pressure loss.

(ii) Due to the fact the adsorption chamber has the a gradually changing cross-sectional area, the gas can smoothly flow from the gas introduction side to the atmospheric side. As a result, it is possible to further reduce the pressure loss.

(iii) A temperature control device is disposed within the adsorption chamber for controlling the temperature of the adsorption material. Using such device, it is possible to increase the amount of desorption of fuel vapor and to eventually decrease the residual amount of fuel vapor. As a result, it is possible to reduce the blow-through amount.

(iv) Compared to the granular adsorption material contained in the adsorption chamber on the gas outlet side of the main canister, the adsorption material contained in the adsorption chamber may have a higher adsorption ability with a larger butane working capacity. These comparisons are made in accordance with ASTM protocols. By using the heat storage material is combination with the adsorption material having the higher adsorption ability it is possible to increase the amount of desorption of fuel vapor. This reduces the residual amount of fuel vapor and eventually reduces the blow-through amount. These reductions can occur in cases using adsorption material having a higher absorption ability.

(v) The above advantages (i) to (iv) synergistically provide both of a decrease in the blow-through amount and a reduction of the pressure loss.

The atmospheric side of the adsorption chamber may be located on the same side as a bottom of the gas introduction side when the trap canister is mounted on a vehicle. Therefore, the fuel vapor may be diffused at the top side layer of the adsorption material within the gas introduction side and that of the cross-sectional area of the adsorption chamber. The blow-through amount can also be reduced in this respect.

The adsorption chamber may include a non-filled space at an intermediate position along a direction of flow of gas through the adsorption chamber. With respect to the non-filled space, the adsorption chamber may be divided into an upstream side and a downstream side with respect to the non-filled space. With this arrangement, the non-filled space may delay diffusion of fuel vapor from the gas introduction side to the atmospheric side. In this way, it is possible to further reduce the blow-through amount.

The temperature control device may be a heat storage material capable of inhibiting a change in temperature of an adsorption material by using latent heat. Therefore, the residual amount of fuel vapor may be reduced to eventually reduce the blow-though amount.

The heat storage material may be granular and mixed with the adsorption material in the adsorption chamber. The two materials may be pre-mixed or mixed later after being added to the adsorption chamber. A mixing ratio between the adsorption material and the heat storage material may change along a direction of flow of gas through the adsorption chamber. With this arrangement, it is possible to stabilize the adsorption/desorption ability of the adsorption material.

Embodiments of the present invention will now be described with reference to FIGS. 1 to 8.

First Embodiment

Figure 1:
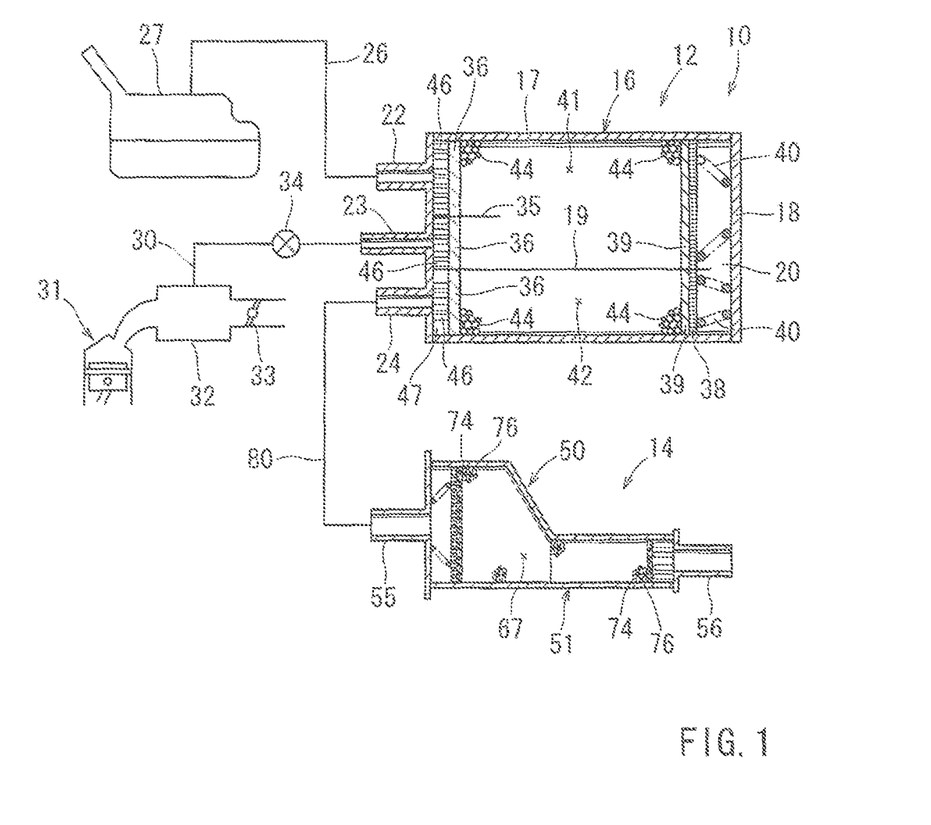
FIG. 1 is a sectional view of a fuel vapor processing apparatus having a trap canister according to a first embodiment.

A first embodiment will be described in relation to a fuel vapor processing apparatus that may be mounted to a vehicle, such as an automobile (not shown). Referring to FIG. 1, there is shown a fuel vapor processing apparatus 10 in a vertical sectional view. The fuel vapor processing apparatus 10 may generally include a main canister 12 and a trap canister 14. For the purpose of explanation, upward, downward, rightward, leftward, forward and rearward directions for the main canister 12 and the trap canister 14 may be described with reference to directions as viewed in FIG. 1. Although the positions or orientations of the main canister 12 and the trap canister 14 relative to the automobile may be suitably determined, the trap canister 14 may be positioned such that its vertical direction in FIG. 1 conforms to the vertical direction of the automobile. In the following, the main canister 12 will be described first, and the trap canister 14 will be described after that.

The main canister 12 may include a main case 16 that may be made of resin. The main case 16 may include a main case body 17 having a tubular shape with a generally rectangular body. A cover 18 may be attached to an open end of the main case body 12. In this embodiment, the bottom side of the main case body 17 is oriented leftward, while the cover 18 is oriented rightward. The internal space of the main case body 17 may be divided into an upper chamber and a lower chamber by a partition wall 19. The upper chamber and the lower chamber may communicate with each other via a communication passage 20 formed between the main case body 17 and the cover 18. In this way, the upper and lower chambers and the communication passage 20 may form a substantially U-shaped gas passage. Although the partition wall 19 divides the internal space of the main case body 17 into the upper and lower chamber in the vertical direction in this embodiment, the partition wall 19 may divide the internal space of the main case body into any two chambers arranged in a direction different from the vertical direction. It is preferable that the two chambers communicate with each other.

At the bottom well (left end wall) of the main case body 17, there is formed a tank port 22, a purge port 23 and a commotion port 24. The tank port 22 may communicate with the upper chamber. The connection port 24 may communicate with the lower chamber. The tank port 22 may be connected to a fuel tank 27 (more specifically, the gaseous-phase space within the fuel tank 27) via a fuel vapor passage 26. The purge port 23 may be connected to an intake passage 32 of an engine 31 via a purge passage 30. A throttle valve 33 may be disposed within the intake passage 32 for controlling the flow rate of the intake air 31. The purge passage 30 may be connected to the intake passage 32 at a position on the downstream side of the throttle valve 33, for example, at a surge tank. A purge control valve 34 may be disposed within the purge passage 30 for opening and closing the purge passage 30. During the operation of the engine 31, an electronic control device known as an ECU may control the purge control valve 34, so that a purge control operation may be performed. The engine 31 may be an internal combustion engine. The connection port 24 may be connected to the trap canister 14 via a connection passage 80 which will be explained later.

The left side portion of the upper chamber may be further divided into an upper space and a lower space by a dividing wall 35. Filters 36 may be respectively disposed at the left end portions of the lower chamber and the upper and lower spaces of the upper chamber. Perforated plates 38 may be respectively disposed at the right end portions (i.e., the open end portions) of the upper and lower chambers. Filters 39 may be positioned to respectively overlap the inner side surfaces (i.e., the left side surfaces) or the perforated plates 38. Springs 40, such as coil springs, may be respectively interposed between the perforated plates 38 and the cover 18. Within the internal space of the upper chamber, a first adsorption chamber 41 may be defined between the filters 36 and the filter 39. Within the lower chamber, a second adsorption chamber 42 may be defined between the filter 36 and the filter 39. Each of the filters 36 and 39 may be formed of a non-won fabric made of resin, urethane foam, etc. A plurality of pin-like projections 46 may be attached to or formed on the bottom wall (left end wall) of the main case body 17 for supporting the filters 36. In this way, port side spaces 47 may be defined between the bottom wall (left end wall) of the main case body 17 and the filters 39.

Granular adsorption materials 44 may be filled within the first adsorption chamber 41 and the second adsorption chamber 42 for adsorbing fuel vapor. More specifically, the granular adsorption materials 44 may allow for adsorption and desorption of butane, etc., contained in the fuel vapor. The granular adsorption material 44 may be activated carbon granules. In this specification, the term "activated carbon granules" is used to include broken activated carbon pieces and granulated activated carbon manufactured by a granulation process mixing granular or powder activated carbon and a binder. The activated carbon granules used as the granular adsorption material 44 in this embodiment may be chosen to have a butane working capacity (herein called "BWC") of less than 12 g/dL when measured according to as ASTM determined method.

Figure 2:
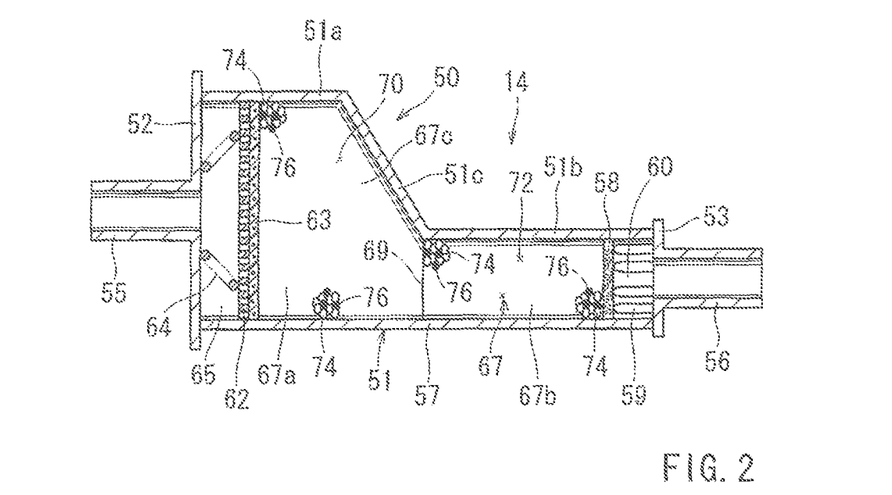
FIG. 2 is a sectional view of a trap canister.

The trap canister 14 will now be described. The trap canister 14 may be designed as a separated device form the main canister 12. FIG. 2 shows the trap canister 14 in a vertical sectional view. The vertical direction in FIG. 2 may conform to the vertical direction of the automobile when the trap canister 14 is mounted to the automobile.

Referring to FIG. 2, the trap canister 14 may be made of resin and may include a trap case body 51, a left cover 52 and a right cover 53. The trap case body 51 may have a substantially cylindrical shape. The left cover 52 and the right cover 53 may be respectively attached to the left open end and the right open end of the trap case body 51. The internal space within the trap case body 51 may define a gas passage extending in the axial direction (the left and right direction as viewed in FIG. 2). The trap case body 51 may include a large diameter tubular portion 51a and a small diameter tubular portion 51b that are respectively positioned on the left side and the right side. The left side cover 52 may include a connection port 55 communicating within the trap case body 51 and having the same axis as the large diameter portion 51a of the trap case body 51. The right side cover 53 may include an atmospheric port 56 communicating within the trap case body 51 and having the same axis as the small diameter tubular portion 51b of the trap case body 51. The atmospheric port 56 may be open to the atmosphere.

In this embodiment, the axis of the larger diameter portion 51a and the axis of the small diameter portion 51b are offset from each other in the vertical direction. A bottom wall 57 may be positioned at the bottom of the trap canister 14 when the trap canister 14 is mounted to the automobile. The bottom wall 57 may define the bottoms of the large diameter portion a 51a and the small diameter portion 51b. In this embodiment, the bottom wall 57 extends linearly in the horizontal direction. Therefore, the axis of the small diameter portion 51b is offset downwardly relative to the axis of the large diameter portion 51a, so that the bottom of the small diameter portion 51b is aligned with the bottom of the large diameter portion 51a. A tapered tubular portion 51c may be formed between the large diameter portion 51a and the small diameter portion 51b. The internal space of the tapered tubular portion 51a may communicate between the internal space of the large diameter portion 51a and the internal space of the small diameter portion 51b. The tapered tubular portion 51c may have a diameter gradually decreasing from the side of the large diameter portion 51a toward the side of the small diameter portion 51b.

A filter 58 may be disposed at the open end on the right side or the small diameter portion 51b of the trap case body 51. For example, the filter 58 may be made of non-woven fabric. A plurality of pin-like projections 59 may be attached to or formed on the inner surface (left side surface) of the right side cover 53 for supporting the filter 58. In this way, a space 60 on the side of the atmospheric port 56 may be defined between the right side cover 53 and the fiber 58. A perforated plate 62 may be disposed at the left open end of the large diameter portion 51a of the trap case body 51. A filter 63 may be positioned to overlap with the inner side surface (i.e., the right side surface) of the perforated plate 62. The filter 63 may be formed of urethane foam. A spring 64, such as a coil spring, may be interposed between the perforated plate 62 and the left side cover 52 to bias the perforated plate 62 leftward. In this way, a space 65 on the side of the connection port 55 may be defined between the left side cover 52 and the perforated plate 62. An adsorption chamber 67 may be defined between the filter 58 and the filter 62 within the internal space of the trap case body 51.

A gas-permeable partition 69 may be disposed at a boundary position between the small diameter portion 51b and the tapered tubular portion 51c for partitioning between the internal space of the small diameter portion 51b and the internal space of the tapered tubular portion 51c. A filer made of foam and having resiliency, such as urethane foam, may be used as the gas-permeable partition 69. The partition 69 may divide the adsorption chamber 57 into two chambers, i.e., a left chamber and a right chamber, which may be a large-diameter side chamber 70 and a small-diameter side chamber 72. The partition 69 may be provided or omitted as necessary.

A mixture of a granular adsorption material 74 and a heat storage material 76 may be placed within the adsorption chamber 67. The granular adsorption material 74 may adsorb fuel vapor, such as butane, and may allow desorption of the same. The heat storage material 76 may generate latent heat that can be used for inhibiting potential change in temperature of the granular adsorption material 74. As the granular adsorption material 74, it may be possible to use broken activated carbon or granulated activated carbon formed of a mixture of a binder and granular or powder activated carbon. The granular adsorptions material 74 may have a BWC value of equal to or more than 13 g/dL, so that the granular adsorption material 74 may have a high adsorption ability. Thus, the BWC value of the activated carbon used for the granular adsorption material 74 may be larger than that of generally used activated carbon (i.e., activated carbon having a BWC value of less than 12 g/dL). Therefore, the granular material 74 may have a higher ratio of small pores to provide larger intermolecular forces between the pores and the residual content of the fuel vapor. Hence, it is possible to reduce the amount of diffusion of the fuel vapor, leading to a decrease in the blow-through amount. The BWC value of the activated carbon used for the granular adsorption material 74 may preferably be 15 g/dL or more and more preferably 17 g/dL or more. In this way, the adsorption ability of the activated carbon used for the granular adsorption material 74 may be higher (larger in the BWC value) than that used for the granular adsorption material 44 located in the second adsorption chamber 42. This granular adsorption material 44 to the second adsorption chamber may be referred to as a "gas outlet-side adsorption chamber." In this specification, the term "gas outlet-sale adsorption chamber" is used to mean a chamber that is located on the side of the connection port 24 (break-through gas discharge side) of the adsorption chambers 41 and 42 of the main canister 12, into which the granular adsorption materials 44 is filled.

The heat storage material 76 may be a latent heat storage material containing a phase-change material that can absorb or radiate latent heat in response to a change in temperature. The heat storage material 76 may be, for example, a phase-change material, microcapsules containing a phase-change material, pellets containing microcapsules or phase-change material, or a combination thereof, etc. The phase-change material may be paraffin, such as heptadecane having a melting point of 22° C. or octadecane having a melting point of 28° C. By using the latent heat of the heat storage material 76, it may be possible to inhibit an increase in temperature of the adsorption material 74 during adsorption of the fuel vapor in order to promote adsorption of the fuel vapor. On the other hand, it may be possible to inhibit a decrease in temperature of the adsorption material 74 during desorption of the fuel vapor in order to promote desorption of the fuel vapor. In this way, the heat storage material 76 may serve as a temperature control device.

As shown in FIG. 1, the connection port 55 of the trap canister 14 and the connection port 24 of the main canister 12 may be connected to each other via a connection passage 80. In FIG. 2, a part of the adsorption chamber 67 defined within the large diameter portion 51a of the trap case body 51 will be referred to as a gas-introduction side 67a. The other part of the adsorption chamber 67 defined within the small diameter portion 51b will be referred to as an atmospheric side 67b. The remaining a part of the adsorption chamber 67 defined in the tapered tubular portion 51c will be referred to as a cross-sectional area changing part 67c. The connection port 24 of the main canister 12 may serve as a break-through gas discharge port, and the connection port 55 of the trap canister 14 may serve as a gas introduction port.

The operation of the fuel vapor processing apparatus 10 will now be described with reference to FIG. 1. During filling of fuel or during a normal state of the automobile (such as during parking), gas containing fuel vapor produced within the fuel tank 27 may be introduced into the first adsorption chamber 41 via the tank port 22 of the main canister 12, so that the gas may flow though the first adsorption chamber 41, the communication passage 20 and the second adsorption chamber 42. During this flow of the gas, the adsorption materials 44 of the first and second adsorption chambers 41 and 42 may adsorb fuel vapor contained in the gas. The gas may then be discharged from the main canister 12 as a break-through gas and may be introduced into the trap canister 14 via the connection passage 80. As the break-though gas flows through the adsorption chamber 67 of the trap canister 14 (see FIG. 2), more specifically, the gas introduction side 67a, the changing cross-sectional area 67c and the atmospheric side 67, the fuel vapor contained in the break-through gas may be adsorbed by the adsorption material 74 of the adsorption chamber 67. During this adsorption process, the latent heat of the heat storage material 76 may be used to inhibit to increase in temperature of the adsorption material 74, which may be caused by the adsorption of the fuel vapor. In this way, it may be possible to promote adsorption of the fuel vapor. Eventually, air that contains substantially little or no fuel vapor may be discharged to the atmosphere via the atmospheric port 56.

During the purge operation (more specifically, during the purge control operation when the engine 31 is being driven), the purge control valve 34 in opened by the electronic control unit (ECU). The negative pressure of the intake air of the engine 31 may be introduced into the first adsorption chamber 41 of the main canister 12 via the purge port 23, so that the atmospheric air may flow in a direction opposite to the direction of flow of the gas. Therefore, fuel vapor adsorbed by the adsorption material 74 of the adsorption chamber 67 of the trap canister 14 may be desorbed (or purged). During this desorption process, the latent heat of the heat storage material 76 may be used for inhibiting a decrease in temperature of the adsorption material 74, so that desorption of fuel vapor can be promoted. In addition, as the gas containing the desorbed fuel vapor flows through the second adsorption chamber 42 and the first adsorption chamber 41, fuel vapor adsorbed by the adsorption materials 44 of the first and second adsorption chambers 42 and 43 also may be desorbed. The gas containing the desorbed fuel vapor may be eventually purged into the intake air passage 32 of the engine 32 via the purge port 23.

With the trap canister 14 (see FIG. 2) of this embodiment, the following advantages can be achieved:

(i) The passage cross-sectional area of the atmospheric side 67b of the adsorption chamber 67 is set to be smaller than that of the gas introduction side 67a. With the cross-sectional area of the atmospheric side 67b being smaller in comparison, the adsorption/desorption ability of the adsorption material 74 can be improved. At the same time, the typical increase in pressure loss normally accompanied by a smaller cross-sectional area may be inhibited or minimized. It is inhibited or minimized by the increase of the passage cross-sectional area on the gas introduction side 67a. In this way, it is possible to improve the DBL emission performance while the resistance against flow of gas can be reduced. In addition, by increasing the passage cross-sectional area of the gas introduction part 67a and reducing the length of the trap case 50 in the axial direction, it is possible to improve the mountability to the vehicle.

(ii) The adsorption chamber 67 includes a cross-sectional changing area 67c preferably having a gradually changing cross-section. In this way, the gas can smoothly flow from the gas introduction side 67a to the atmospheric side 67b. As a result, it is possible to reduce the loss of pressure.

(iii) The heat storage material 76 is disposed within the adsorption chamber 67 and can control the temperature of the adsorption material 74. With this control of temperature by the heat storage material 76, it is possible to increase the amount of desorption of fuel vapor and eventually decrease the residual amount of fuel vapor. As a result, it is possible to reduce the blow-through amount and to improve the DBL emission performance.

(iv) The adsorption material 74 has a larger BWC value to provide a higher adsorption ability than that of the granular adsorption material 44 filled into the gas outlet side adsorption chamber (i.e., the second adsorption chamber 42) of the main canister 12. By using the heat storage material 76 in combination with the adsorption material 74 (having higher adsorption ability), it is possible to increase the amount of desorption of fuel vapor. This results in a reduction in the residual amount of fuel vapor and eventually a reduction in the blow-through amount. Such results can be achieved in such instances where adsorption material 74 having a high adsorption ability is used. Eventually, it is possible to improve the DBL emission performance.

(v) The above advantages (1) to (4) synergistically provide both a decrease in the blow-through amount and a reduction in pressure loss.

Further, the atmospheric side 67b of the adsorption chamber 67 is located such that it is positioned on a side corresponding to the bottom side of the gas introduction side 67a when the trap canister 14 is mounted on the vehicle. Therefore, the fuel vapor may be diffused at the top side layer of the adsorption material 74 within the gas introduction side 67a and that of the changing cross-sectional area 67c of the adsorption chamber 67. In this way, adsorption of fuel vapor can be efficiently performed. In this way, the blow-through amount can also be reduced in this respect. Thus, a 2 g break-through fuel vapor flown from the main canister 12 can be adsorbed at the top side layers of the gas introduction side 67a and the changing cross-sectional area 67c to improve DBL emission performance. Here, the term "2 g break-through fuel vapor" means 2 g of the fuel vapor contained in the break-through gas that is flown from the main canister 12.

Further, using the latent heat of the heat storage material 76 to inhibit change in temperature of the adsorption material 74 by may reduce the residual amount of fuel vapor and may eventually reduce the blow-through amount.

Second to Seventh embodiments will now be described with reference to FIGS. 3 to 7. These embodiments are modifications of the trap canister 14 of the first embodiment. Therefore, in FIGS. 3 to 7, like members are given the same reference numerals as the first embodiment and the description of these members will not be repeated.

Second Embodiment

Figure 3:
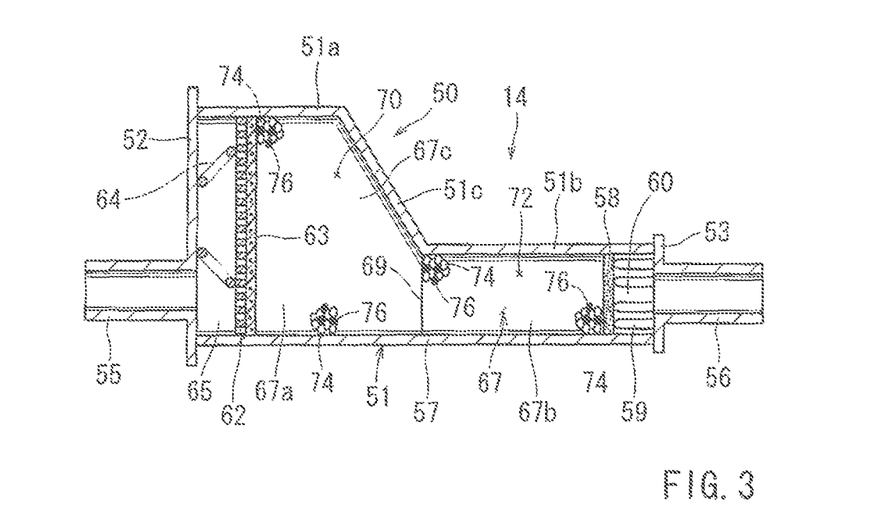
FIG. 3 is a sectional view of a trap canister according to a second embodiment.

A second embodiment will now be described with reference to FIG. 3. The trap canister 14 of this embodiment is different from the trap canister 14 shown in FIG. 2 of the first embodiment in that the connection port 55 has the same axis as the atmospheric port 56 of the right side cover 52. Therefore, the gas introduced from the connection port 24 may flow along a linear path toward the atmospheric port 56. Hence, potential loss of pressure of the gas flowing through the adsorption chamber 67 can be further reduced.

Third Embodiment

Figure 4:
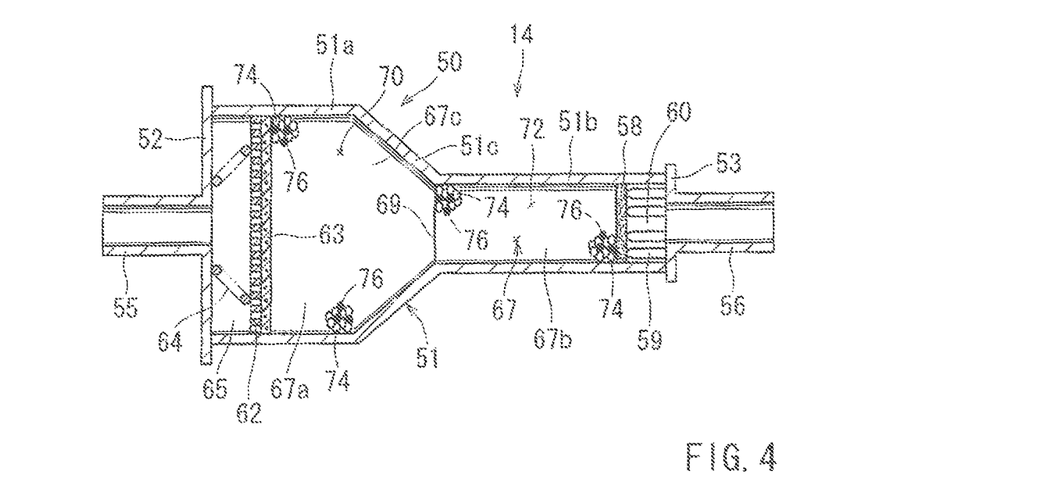
FIG. 4 is a sectional view of a trap canister according to a third embodiment.

In a third embodiment shown in FIG. 4, the large diameter portion 51a, the small diameter portion 51b, the tapered tubular portion 51c, the connection port 55 and the atmospheric port 56 have the same axis.

Fourth Embodiment

Figure 5:
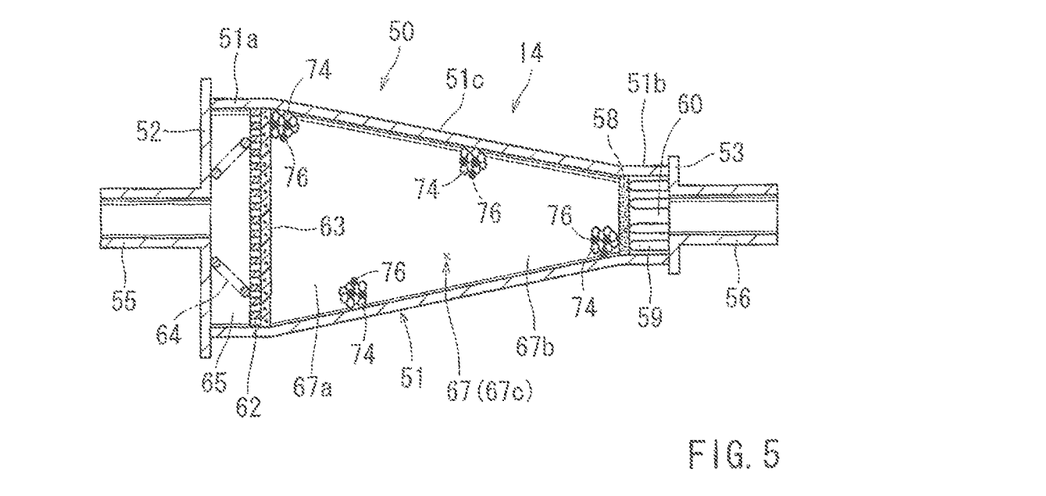
FIG. 5 is a sectional view of a trap canister according to a fourth embodiment.

The trap canister 14 of a fourth embodiment shown in FIG. 5 is different from the trap canister 14 shown in FIG. 2 of the first embodiment in that the tapered tubular portion 51c of the trap case body 51 extends throughout the axial length of the adsorption chamber 67. In this case, the internal space of the large-diameter side end portion of the tapered tubular portion 51c may serve as the gas introduction side 67a, and the internal space of the small-diameter side end portion of the tapered tubular portion 51c may serve as the atmospheric side 67b. In this way, the entire space of the adsorption chamber 67 is configured as the changing cross-sectional area 67c. In this embodiment, the partition 69 is omitted, and therefore, the large-diameter side chamber 70 and the small-diameter side chamber 72 are not partitioned from each other.

Fifth Embodiment

Figure 6:
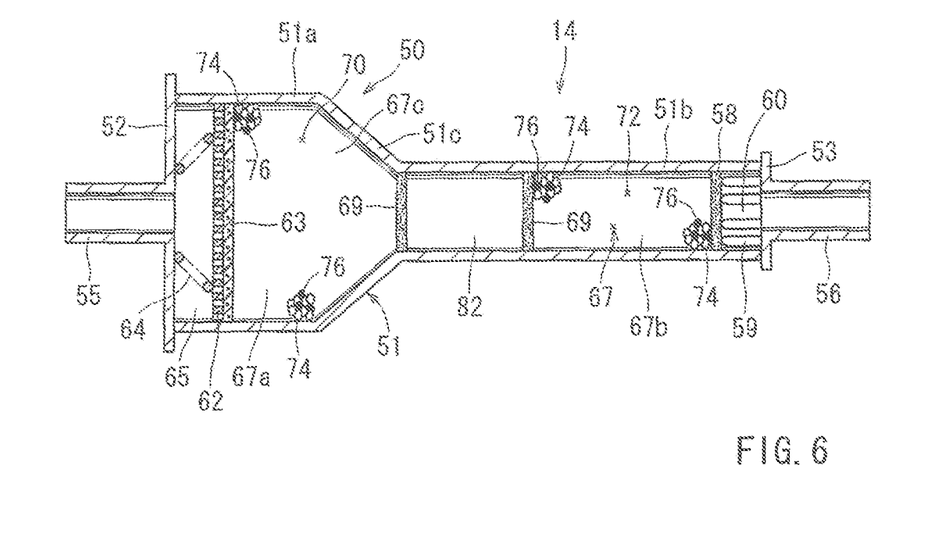
FIG. 6 is a sectional view of a trap canister according to a fifth embodiment.

A fifth embodiment will now be described with reference to FIG. 6. This embodiment is a further modification of the third embodiment shown in FIG. 4. In this embodiment, a non-filled space 82 having no adsorption material filled therein is defined within the adsorption chamber 67 at an intermediate position along a direction of flow of the gas, i.e., a position between the large-diameter side chamber 70 and the small-diameter side chamber 72. In order to provide room for the non-filled space 82, the axial length of the small diameter portion 51b shown in FIG. 4 may be extended. Partitions 69 may be provided between the large-diameter side chamber 70 and the non-filled pace 82 as well as between the small-diameter side chamber 72 and the non-filled space 82. With this arrangement, the non-filled space 82 may serve to cause delay in diffusion of fuel vapor from the gas introduction side 67a and the changing cross-sectional area 67c to the atmospheric side 67b. In this way, it is possible to further reduce the blow-through amount and to eventually further improve DBL emission performance.

Sixth Embodiment

Figure 7:
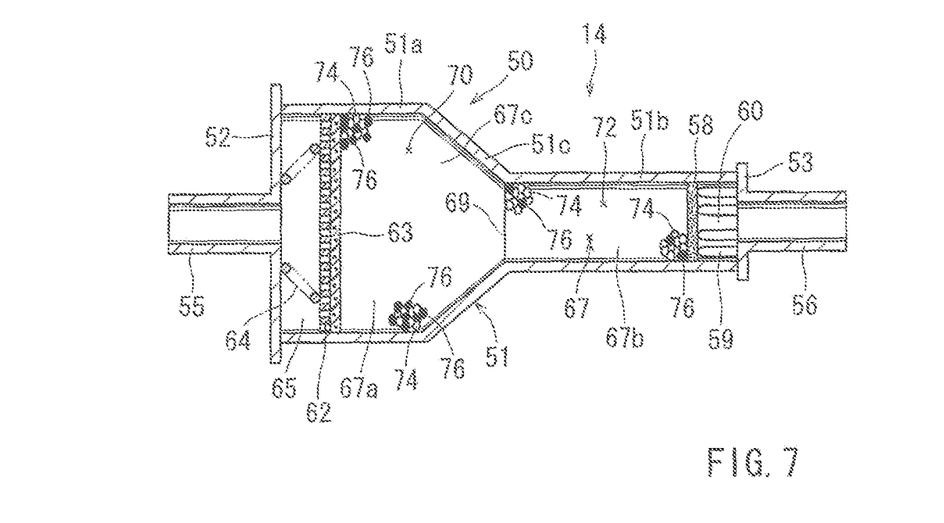
FIG. 7 is a sectional view of a trap canister according to a sixth embodiment.

A sixth embodiment will now be described with reference to FIG. 7. This embodiment is a modification of the third embodiment shown in FIG. 4. In this embodiment, the mixing ratio of the adsorption material 74 to the heat storage material 76 contained in the adsorption chamber 67 changes along the direction of flow of the gas through the adsorption chamber 67. For example, the ratio of the heat storage material 76 in the mixture contained in the small-diameter side chamber 72 may be set to be smaller than that of the heat storage material 76 in the mixture contained in the large-diameter side chamber 70. With this setting of the mixing ratio, it is possible to stabilize the adsorption/desorption ability of the adsorption material 74. The mixing ratio between the adsorption material 74 and the heat storage material 76 may be suitably determined.

Seventh Embodiment

Figure 8:
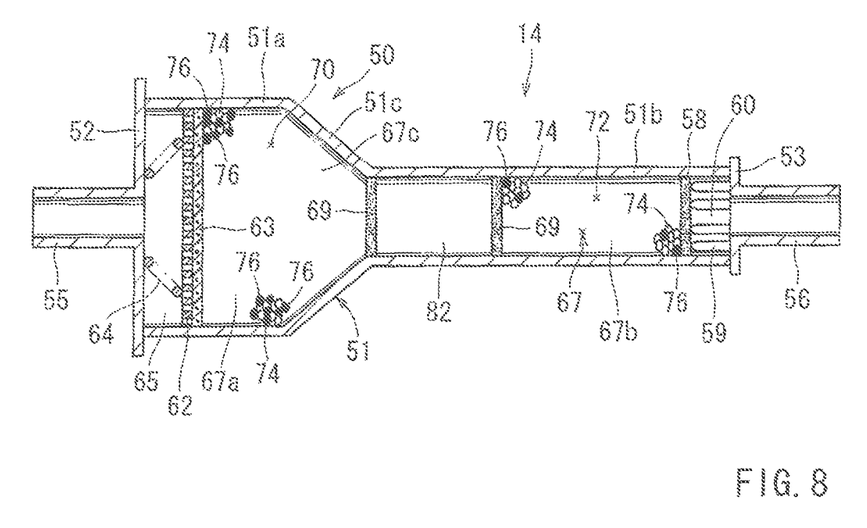
FIG. 8 is a sectional view of a trap canister according to a seventh embodiment.

A seventh embodiment will now be described with reference to FIG. 8. This embodiment is a modification of the fifth embodiment shown in FIG. 6. It is different from the fifth embodiment in that the mixing ratio between the adsorption material 74 and the heat storage material 76 in the large-diameter side chamber 70 and that in the small-diameter side chamber 72 are determined in the same manner as the sixth embodiment.

OTHER POSSIBLE MODIFICATIONS

The above embodiments may be modified in various ways. For example, although the adsorption chamber 67 of the trap canister 14 in the above embodiments has a cylindrical cross-sectional in a direction perpendicular to the flow of gas, the adsorption chamber 67 may have a polygonal cross-sectional shape. Further, the adsorption chamber 67 of the trap canister 14 may be divided into three or more divisional chambers. It may be also possible that the adsorption chamber 67 is a single chamber that is not divided into a plurality of divisional chambers. Further, the heat storage material 76 may have any other configuration than the granular configuration. Furthermore, the heat storage material 76 may be replaced with any other temperature control device, such as an electric heater.

What is claimed is:

1. A fuel vapor processing apparatus comprising:
    a main canister having a main canister case, at least a first adsorption chamber defined in the main canister on an outlet side, and a first adsorption material contained in the first adsorption chamber;
    a trap canister having a trap case having a second adsorption chamber defined therein and containing a second adsorption material, the second adsorption chamber communicating with the first adsorption chamber of the main canister, so that break-through gas discharged from the first adsorption chamber is introduced into the second adsorption chamber and flows through the second adsorption material in a gas flow direction; wherein:
        the second adsorption chamber includes a gas introduction side and a gas outlet side located downstream of the gas introduction side along the gas flow direction;
        the trap case comprises an introduction side tubular portion having a gas introduction port connected to an outlet of the main canister, an outlet side tubular portion having a gas outlet port open to an atmosphere, and an intermediate tubular portion, wherein the introduction side tubular portion is in communication with the outlet side tubular portion through the intermediate tubular portion;
        each of the introduction side tubular portion and the outlet side tubular portion has a respective passage cross sectional area that is substantially uniform and unvarying along the gas flow direction, wherein the passage cross sectional area of the outlet side tubular portion is smaller than the passage cross sectional area of the introduction side tubular portion;
        the intermediate tubular portion is tapered such that a passage cross sectional area of the intermediate tubular portion gradually decreases from the introduction side tubular portion toward the outlet side tubular portion;
    a first partition member disposed within the introduction side tubular portion at the introduction side of the second adsorption chamber;
    and second partition member disposed within the outlet side tubular portion at the outlet side of the second adsorption chamber;
    wherein each of the first partition member and the second partition member has a gas permeability, and wherein the first partition member is freely movable within the trap case in the gas flow direction toward the second partition member;
    a temperature control device configured to control a temperature of the second adsorption material;
    wherein the first adsorption material has a first fuel adsorption ability; and
    wherein the second adsorption material has a second fuel adsorption ability higher than the first fuel adsorption ability.

2. The fuel vapor processing apparatus according to claim 1, wherein the first partition member is biased toward the second adsorption material by a spring.

3. The fuel vapor processing apparatus according to claim 1, wherein the first partition member comprises a perforated plate and a filter.

4. The fuel vapor processing apparatus according to claim 1, wherein when the trap canister is mounted on a vehicle, the outlet side tubular portion of the trap case is located at a lower position than the introduction side tubular portion so that the gas introduced into the gas introduction port is configured to flow downwardly toward the gas outlet port.

5. The fuel vapor processing apparatus according to claim 1, further comprising:
    a third partition member;
    a fourth partition member;
    wherein the third partition member and the fourth partition member are each disposed within the second adsorption chamber in the outlet side tubular portion of the trap canister, and wherein the first partition member is spaced from the fourth partition member along the gas flow direction; and
    a non-filled space having no adsorption material disposed therein is defined between the third partition member and the fourth partition member.

6. The fuel vapor processing apparatus according to claim 1, wherein the temperature control device comprises a heat storage material configured to store and emit latent heat to inhibit a change in temperature of the second adsorption material.

7. The fuel vapor processing apparatus according to claim 6, wherein the heat storage material is a granular material that is mixed with the second adsorption material in the second adsorption chamber; and
    wherein a mixing ratio between the second adsorption material and the heat storage material changes along the gas flow direction through the second adsorption chamber.

8. A fuel vapor processing apparatus comprising:
    a main canister having a main canister case, at least a first adsorption chamber defined in the main canister on an outlet side, and a first adsorption material contained in the first adsorption chamber;
    a trap canister having a trap case having a second adsorption chamber defined therein and containing a second adsorption material, the second adsorption chamber communicating with the first adsorption chamber of the main canister, so that break-through gas discharged from the first adsorption chamber is introduced into the second adsorption chamber and flows through the second adsorption material in a gas flow direction; wherein:
        the second adsorption chamber includes a gas introduction side and a gas outlet side located downstream of the gas introduction side along the gas flow direction;
        the trap case comprises an introduction side tubular portion having a gas introduction port connected to an outlet of the main canister, an outlet side tubular portion having a gas outlet port open to an atmosphere, and an intermediate tubular portion, wherein the introduction side tubular portion is in communication with the outlet side tubular portion through the intermediate tubular portion;
        each of the introduction side tubular portion and the outlet side tubular portion has a respective passage cross sectional area that is substantially uniform and unvarying along the gas flow direction, wherein the passage cross sectional area of the outlet side tubular portion is smaller than the passage cross sectional area of the introduction side tubular portion;

the intermediate tubular portion is tapered such that a passage cross sectional area of the intermediate tubular portion gradually decreases from the introduction side tubular portion toward the outlet side tubular portion;

a first partition member disposed within the introduction side tubular portion at the introduction side of the second adsorption chamber;

a second partition member disposed within the outlet side tubular portion at the outlet side of the second adsorption chamber;

wherein each of the first partition member and the second partition member has a gas permeability, and wherein the first partition member is freely movable within the trap case in the gas flow direction toward the second partition member;

a temperature control device configured to control a temperature of the second adsorption material;

wherein the first adsorption material has a first butane working capacity (BWC) measured according to a method determined by the American Society for Testing and Materials (ASTM); and wherein the second adsorption material has a second BWC measured according to the method determined by the ASTM; and the second BWC is larger than the first BWC.

9. The fuel vapor processing apparatus according to claim 8, wherein the first partition member is biased toward the second adsorption material by a spring.

10. The fuel vapor processing apparatus according to claim 9, wherein the first partition member comprises a perforated plate and a filter.

11. The fuel vapor processing apparatus according to claim 8, wherein when the trap canister is mounted on a vehicle, the outlet side tubular portion of the trap case is located at a lower position than the introduction side tubular portion so that the gas introduced into the gas introduction port is configured to flow downwardly toward the gas outlet port.

12. The fuel vapor processing apparatus according to claim 8, further comprising:
 a third partition member;
 a fourth partition member;
 wherein the third partition member and the fourth partition member are each disposed within the second adsorption chamber in the outlet side tubular portion of the trap canister, and wherein the first partition member is spaced from the fourth partition member along the gas flow direction; and
 a non-filled space having no adsorption material disposed therein is defined between the third partition member and the fourth partition member.

13. The fuel vapor processing apparatus according to claim 8, wherein the temperature control device comprises a heat storage material configured to store and emit latent heat to inhibit a change in temperature of the second adsorption material.

14. The fuel vapor processing apparatus according to claim 13, wherein the heat storage material is a granular material that is mixed with the second adsorption material in the second adsorption chamber; and
 wherein a mixing ratio between the second adsorption material and the heat storage material changes along the gas flow direction through the second adsorption chamber.

* * * * *

UNITED STATES PATENT AND TRADEMARK OFFICE
CERTIFICATE OF CORRECTION

| | | |
|---|---|---|
| PATENT NO. | : 9,005,350 B2 | Page 1 of 1 |
| APPLICATION NO. | : 13/846309 | |
| DATED | : April 14, 2015 | |
| INVENTOR(S) | : Mani | |

It is certified that error appears in the above-identified patent and that said Letters Patent is hereby corrected as shown below:

In the Claims

Column 12, line 20, claim 1, "wherein the first partition member" should read -- wherein the third partition member.

Column 14, line 14, claim 8, "wherein the first partition member" should read -- wherein the third partition member.

Signed and Sealed this
Fifteenth Day of September, 2015

Michelle K. Lee
*Director of the United States Patent and Trademark Office*